United States Patent
Nelson et al.

(10) Patent No.: US 10,726,680 B2
(45) Date of Patent: Jul. 28, 2020

(54) AUGMENTED REALITY COIN PUSHER

(71) Applicant: IGT, Las Vegas, NV (US)

(72) Inventors: Dwayne Nelson, Las Vegas, NV (US); Patrick Danielson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 100 days.

(21) Appl. No.: 15/999,557

(22) Filed: Aug. 20, 2018

(65) Prior Publication Data

US 2020/0058196 A1  Feb. 20, 2020

(51) Int. Cl.
  *G07F 17/00* (2006.01)
  *G07F 17/32* (2006.01)
  *G06T 19/00* (2011.01)

(52) U.S. Cl.
  CPC ........ *G07F 17/3297* (2013.01); *G06T 19/006* (2013.01); *G07F 17/3211* (2013.01); *G07F 17/3267* (2013.01)

(58) Field of Classification Search
  None
  See application file for complete search history.

(56) References Cited

U.S. PATENT DOCUMENTS

| | | | |
|---|---|---|---|
| 8,235,529 B1 | 8/2012 | Raffle et al. | |
| 8,558,759 B1 | 10/2013 | Prada et al. | |
| 8,821,274 B2 | 9/2014 | Lyons et al. | |
| 8,943,420 B2 | 1/2015 | Goldthwaite et al. | |
| 9,280,867 B2 | 3/2016 | Froy et al. | |
| 9,280,868 B2 | 3/2016 | Froy et al. | |
| 9,285,592 B2 | 3/2016 | Olsson et al. | |
| 9,412,201 B2 | 8/2016 | Kinnebrew et al. | |
| 9,558,612 B2 | 1/2017 | Lyons et al. | |
| 9,568,620 B2 | 1/2017 | Froy et al. | |
| 9,569,920 B2 | 2/2017 | Froy et al. | |
| 2002/0098880 A1* | 7/2002 | Rodden | G07F 17/3297 463/2 |
| 2012/0115581 A1* | 5/2012 | Englman | G07F 17/34 463/25 |
| 2013/0210523 A1* | 8/2013 | Arumugam | G07F 17/3255 463/31 |
| 2013/0337901 A1* | 12/2013 | Saruta | A63F 13/10 463/25 |
| 2014/0121015 A1 | 5/2014 | Massing et al. | |
| 2014/0168261 A1 | 6/2014 | Margolis et al. | |

(Continued)

*Primary Examiner* — Paul A D'Agostino
(74) *Attorney, Agent, or Firm* — Sage Patent Group

(57) ABSTRACT

Real-time image data of coins that are on a physical coin pusher playfield and that are adjacent a drop-off edge of the physical coin pusher playfield may be received. An augmented reality (AR) device may generate AR display content that includes first game content that is viewable by a user of the AR device and that is associated with one of the coins. An action of the first virtual element may be generated responsive to physical movement of the one of the coins in response to generating the action of the first element. An AR award to the user that is associated with the first virtual element may be generated. A combined image corresponding to an image of the physical coin pusher game that is viewable through the AR device and the AR display content that may be generated by the AR device may be provided to the user.

20 Claims, 13 Drawing Sheets

(56) References Cited

U.S. PATENT DOCUMENTS

2015/0126279 A1\* 5/2015 Lyons ................. G07F 17/3204
 463/33
2016/0373570 A1 12/2016 Scavezze et al.
2018/0130283 A1\* 5/2018 Froy ................... G07F 17/3209
2019/0051101 A1\* 2/2019 Russ .................. G07F 17/3211

\* cited by examiner

US 10,726,680 B2

AUGMENTED REALITY COIN PUSHER

BACKGROUND

Embodiments described herein relate to augmented reality systems and methods, and in particular to electronic gaming machines that interoperate with augmented reality systems.

A coin pusher is a style of game that is used for entertainment and in gaming. The player launches or drops coins, such as currency or tokens into a physical playfield of the coin pusher. The physical playfield may include coins and/or other objects that the user may try to win. The coin pusher may further include one or more pushing mechanisms that are operable to push coins towards an edge of the physical playfield. The player attempts to cause the coins and/or other objects to fall off the edge of the physical playfield. Any coins or objects that fall off the edge of the physical are collected by the player.

In the casino gaming industry, many of the electronic and electro-mechanical gaming machines (EGMs) have transitioned to paper currency and/or electronic value transfer systems that do not rely on coins, such as currency or tokens. As such, conventional coin pushers have declined in popularity.

BRIEF SUMMARY

Some embodiments are directed to a computer implemented method that includes receiving real-time image data of multiple coins that are on a physical coin pusher playfield and that are adjacent a drop-off edge of the physical coin pusher playfield. Operations include generating, using an augmented reality (AR) device, AR display content that includes first game content that is viewable by a user of the AR device and that is associated with one of the coins. The AR display content includes a first virtual element that corresponds to the one of the coins. Operations further include generating an action of the first virtual element responsive to physical movement of one of the coins and, responsive to generating the action of the first element, generating an AR award to the user that is associated with the first virtual element. A combined image corresponding to an image of the physical coin pusher game viewable through the AR device and the AR display content generated by the AR device is provided to the user.

Some embodiments provide an augmented reality (AR) system that includes a physical coin pusher game that is configured to receive coins from a user. As used herein, the term "coin" may include currency and/or non-currency coins, tokens, casino chips and/or any other small physical representation of value. The physical coin pusher game includes a playfield that is configured to support multiple coins and that includes a drop-off edge and a mechanical device that is configured to sweep ones of the coins off a portion of the playfield. Responsive to the ones of the coins being swept off the portion of the playfield, a return coin of the coins is pushed to a position on the drop-off edge that causes the coin to fall off the playfield. An augmented reality (AR) device is configured to generate AR display content that includes first game content that is viewable by a user of the AR device and that is associated with one of the coins. The AR device includes a processing circuit, a transceiver coupled to the processing circuit, and a display device coupled to the processing circuit and configured to display the AR display content within a field of view of a user when the user is viewing the playfield of the physical coin pusher game. The AR display content includes multiple virtual elements that are displayed as being on the playfield and that are associated with multiple AR awards that are provided to the user based on interaction between ones of the coins and ones of the virtual elements.

Some embodiments are directed to an augmented reality (AR) apparatus that includes a processing circuit, a transceiver coupled to the processing circuit, and a display device coupled to the processing circuit and configured to display AR display content within a field of view of a user while the user is playing a wagering game. The AR display content includes a virtual coin pusher game that includes multiple virtual coins that each are associated with an AR award. Responsive to a wagering event that occurs in the wagering game, the virtual coin pusher game receives a deposited coin. Responsive to receiving the deposited coin, one of the virtual coins is pushed off a virtual playfield of the virtual coin pusher game and the AR award corresponding to the virtual coin that is pushed off the playfield is awarded to the user.

DETAILED DESCRIPTION

Embodiments of the inventive concepts provide systems, methods and apparatus for providing augmented reality (AR) content corresponding to a coin pusher game machine. The AR display content may be displayed on or in connection with a coin pusher game machine, or even independently from the coin pusher game machine, to a player of or an observer (non-player) who is watching a player play the coin pusher game machine. According to various embodiments, the AR display content can be rendered to the player on an AR viewer, such as an AR device that communicates with the coin pusher game machine so that the AR display content displayed to the player on the AR headset is coordinated with the coin pusher game machine. "Augmented reality" or "AR" may also be referred to as "mixed reality."

Some embodiments provide a headset display with pass through mixed reality rendering. A 3D model and 3D scanner can be used to track and locate objects, such as a user, a user's hand, other players, EGMs, etc., within an area, such as a casino floor. The headset display allows the user to see virtual objects that appear to be physically present in the real world. The headset display also allows the user to move around while rendered virtual objects (e.g. interface buttons, avatars, videos, personally pinned alerts/notifications/statistics etc.) may appear to stay in place or move along with the player. These and other embodiments are described in more detail below.

Augmented Reality EGM Systems and Viewers

Figure 1:
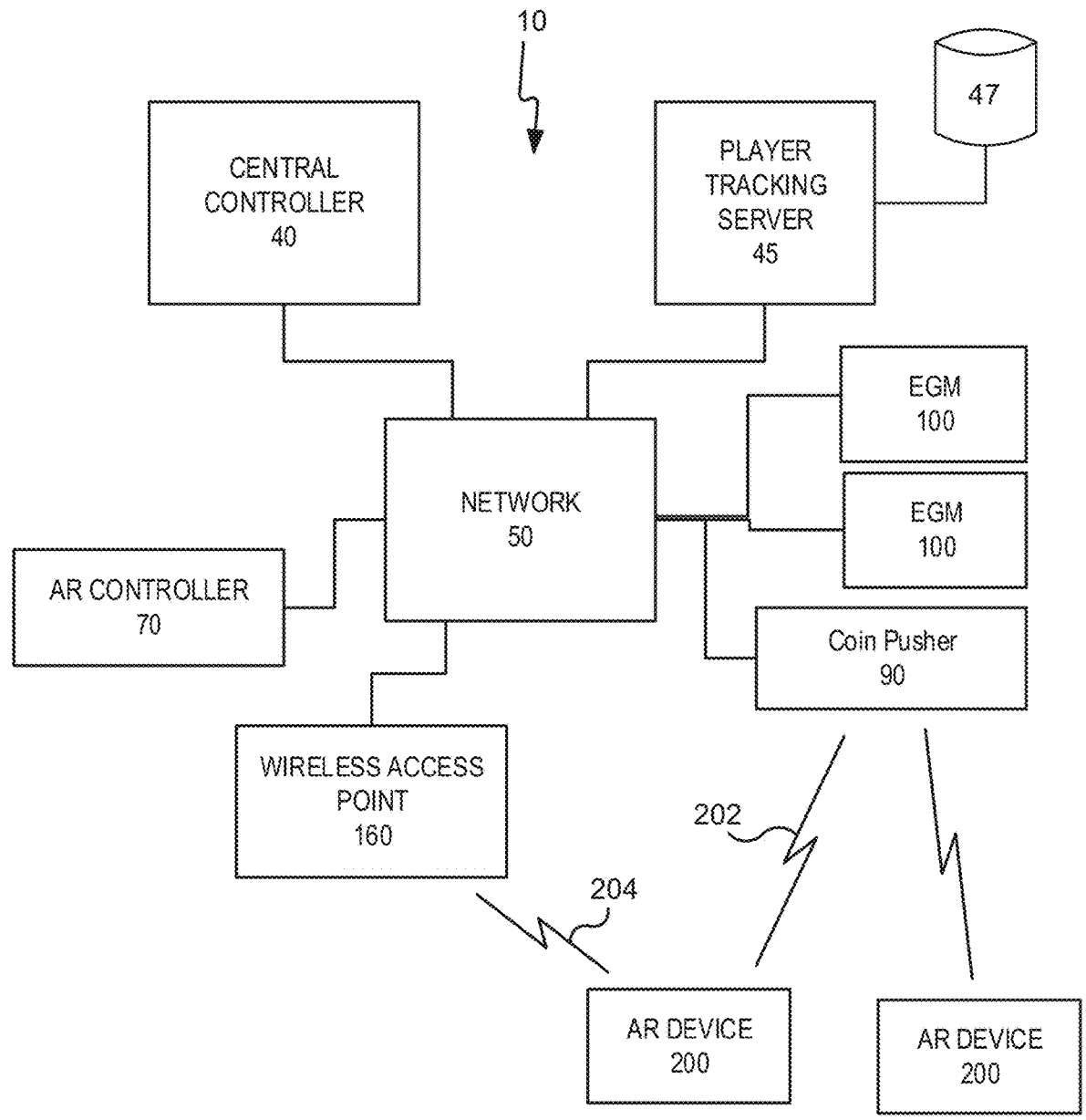
FIG. 1 is a schematic block diagram illustrating a network configuration for a plurality of gaming devices according to some embodiments.

Referring to FIG. 1, a gaming system 10 including a plurality of EGMs 100 is illustrated. The gaming system 10 may be located, for example, on the premises of a gaming establishment, such as a casino. The EGMs 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the EGMs 100. Communications over the data communication network 50 may be encrypted for security. The central controller 40 may be any suitable server or computing device which includes at least one processor and at least one memory or storage device. Each EGM 100 may include a processor that transmits and receives events, messages, commands or any other suitable data or signal between the EGM 100 and the central controller 40. The EGM processor is operable to execute such communicated events, messages or commands in conjunction with the operation of the EGM. Moreover, the processor of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processors. Moreover, in some embodiments, one or more of the functions of one or more EGM processors as disclosed herein may be performed by the central controller 40.

A wireless access point 160 provides wireless access to the data communication network 50. The wireless access point 160 may be connected to the data communication network 50 as illustrated in FIG. 1, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a coin pusher game machine 90 (coin pusher). The coin pusher 90 may be in communication with the central controller 40 through the data network 50. Each coin pusher 90 may include a processor that transmits and receives events, messages, commands or any other suitable data or signal between the coin pusher 90 and the central controller 40. The coin pusher processor may be operable to execute such communicated events, messages or commands in conjunction with the operation of the coin pusher. Moreover, in some embodiments, one or more of the functions of one or more coin pusher processors as disclosed herein may be performed by the central controller 40.

As further illustrated in FIG. 1, an AR device 200, is provided. The AR device 200 communicates with one or more elements of the gaming system 10 to render two-dimensional (2D) and/or three-dimensional (3D) content to a player of one of the EGMs 100 and/or the coin pusher 90 in a virtual space, while at the same time allowing the player to see objects in the real space around the player. That is, the AR device 200 combines a virtual image with real images perceived by the user, including images of real objects as well as objects displayed by the EGM 100 and/or the coin pusher 90. In this manner, the AR device 200 "mixes" real and virtual reality into a single viewing experience for the player. In some embodiments, the AR device 200 may be further configured to enable the player to interact with both the real and virtual objects displayed to the player by the AR device 200.

The AR device 200 communicates with one or more elements of the system 10 to coordinate the rendering of mixed reality images. For example, in some embodiments, the AR device 200 may communicate directly with the coin pusher 90 over a wireless interface 202, which may be a WiFi link, a Bluetooth link, an NFC link, etc. In other embodiments, the AR device 200 may communicate with the data communication network 50 (and devices connected thereto, including EGMs and the coin pusher) over a wireless interface 204 with the wireless access point 160. The wireless interface 204 may include a WiFi link, a Bluetooth link, an NFC link, etc. In still further embodiments, the AR device 200 may communicate simultaneously with both the coin pusher 90 over the wireless interface 202 and the wireless access point 160 over the wireless interface 204. In these embodiments, the wireless interface 202 and the wireless interface 204 may use different communication protocols and/or different communication resources, such as different frequencies, time slots, spreading codes, etc. For example, in some embodiments, the wireless interface 202 may be a Bluetooth link, while the wireless interface 204 may be a WiFi link.

The wireless interfaces 202, 204 allow the AR device 200 to coordinate the generation and rendering of mixed reality images to the player via the AR device 200.

In some embodiments, the gaming system 10 includes a mixed reality controller, or AR controller 70. The AR controller 70 may be a computing system that communicates through the data communication network 50 with the coin pusher 90 and the AR devices 200 to coordinate the generation and rendering of virtual images to one or more players using the AR devices 200. The AR controller 70 may be implemented within or separately from the central controller 40.

In some embodiments, the AR controller 70 may coordinate the generation and display of the virtual images of the same virtual object to more than one player by more than one AR device 200. As described in more detail below, this may enable multiple players to interact with the same virtual object together in real time. This feature can be used to provide a shared multiplayer experience to multiple players at the same time.

Moreover, in some embodiments, the AR controller 70 may coordinate the generation and display of the same virtual object to players at different physical locations, as will be described in more detail below.

Figure 9A:
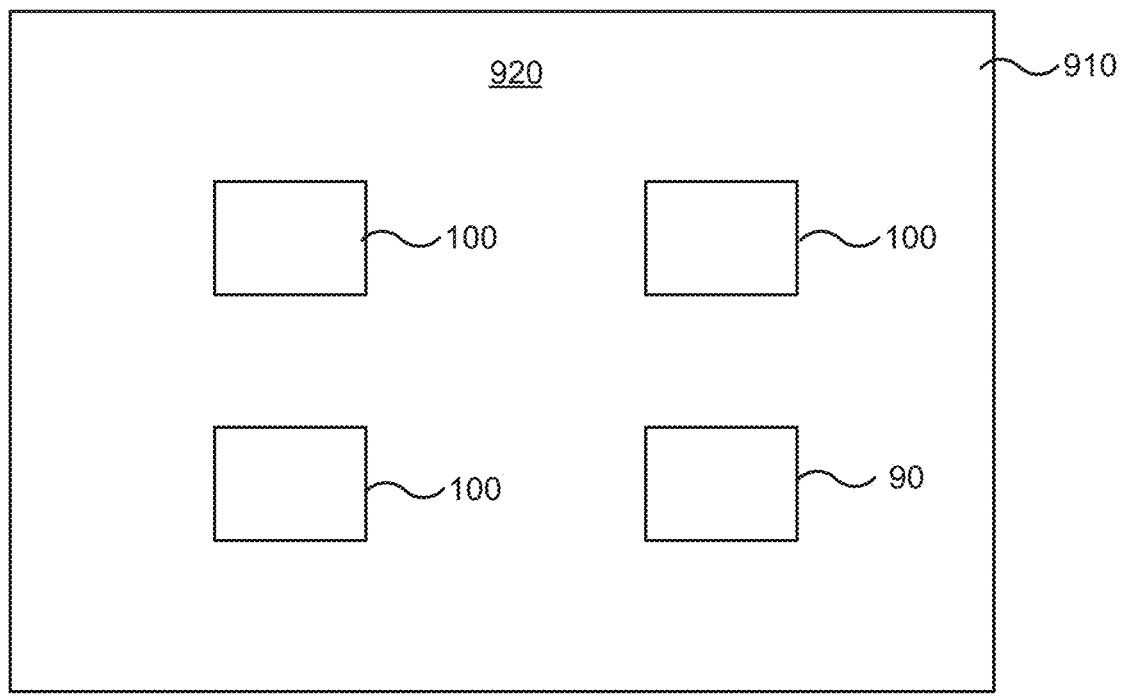
FIG. 9A is a map of a gaming area, such as a casino floor.
Figure 9B:
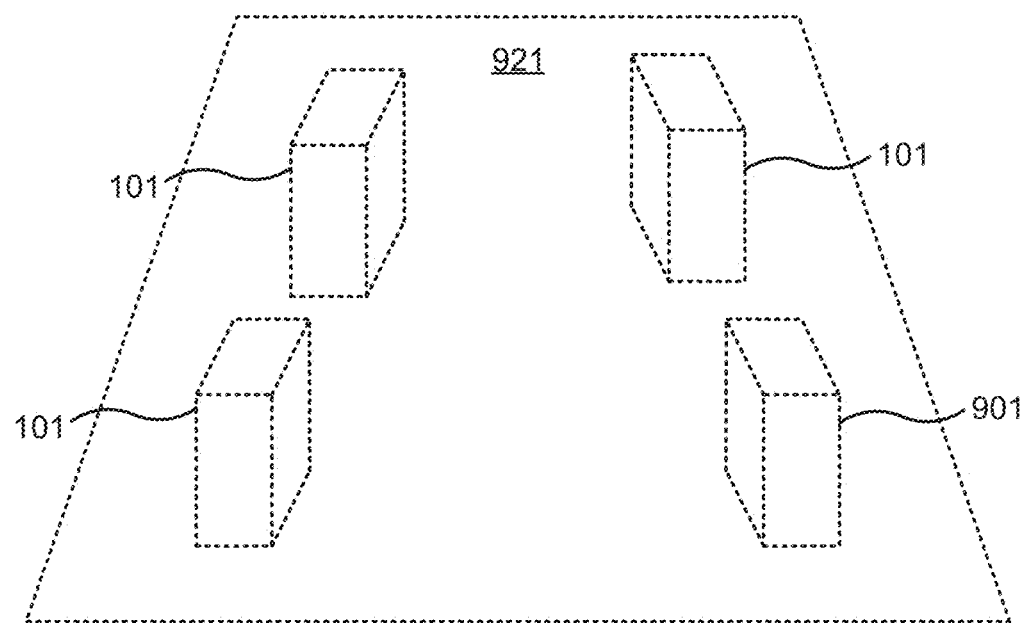
FIG. 9B is a 3D wireframe model of the gaming area of FIG. 9A.

Brief reference is made to FIGS. 9A and 9B which are schematic diagrams of a map of a gaming area, such as a casino floor and a three-dimensional wireframe model of the map of the gaming area. The AR controller 70 may store a three-dimensional wireframe model 921 of a map 910 of a gaming area 920, such as a casino floor, and may provide the three-dimensional wireframe model 921 to the AR devices 200. The map 910 shows the location of a plurality of EGMs 100 within the gaming area 920. The three-dimensional wireframe model 921 shows EGM wireframe representations 101 and coin pusher wireframe representations 901.

As will be appreciated, the locations of the EGMs 100 within a gaming area 920 are generally fixed, although a casino operator may relocate EGMs 100 from time to time, such as when new EGMs are introduced, to create new traffic flow patterns within the gaming area 920, to feature or highlight certain games, etc. As noted above, in order to assist the operation of the mixed reality viewers 200, the AR controller 114 may store a three-dimensional wireframe model 921 of the gaming area 920, and may provide the three-dimensional wireframe model to the mixed reality viewers 200. In some embodiments, the three-dimensional wireframe model 921 may be generated dynamically, such as by surveying the gaming area 920 with the mixed reality viewers 200 in real time.

In some embodiments, the three-dimensional wireframe model 921 may be generated dynamically based on data received as the AR device 200 scans the surrounding environment, such as a casino floor, for example. The wireframe map may store various information about EGMs 100 and coin pushers 90 in the gaming area, such as the identity, type and location of various types of EGMs 100 and coin pushers 90. The three-dimensional wireframe map may enable an AR device 200 to more quickly and accurately determine its position and/or orientation within the gaming area, and also may enable the AR device 200 to assist the player in navigating the gaming area while using the AR device 200.

In some embodiments, at least some processing of virtual images and/or objects that are rendered by the AR devices 200 may be performed by the AR controller 70, thereby offloading at least some processing requirements from the AR devices 200.

Referring to FIGS. 2A to 2D, the AR device 200 may be implemented in a number of different ways. For example, referring to FIG. 2A, in some embodiments, an AR device 200A may be implemented as a 3D headset including a pair of semitransparent lenses 212 on which images of virtual objects may be displayed. Different stereoscopic images may be displayed on the lenses 212 to create an appearance of depth, while the semitransparent nature of the lenses 212 allow the user to see both the real world as well as the 3D image rendered on the lenses 212. The AR device 200A may be implemented, for example, using a Hololens from Microsoft Corporation. The Microsoft Hololens includes a plurality of cameras 234 and other sensors 211 that the device uses to build a 3D model of the space around the user. The device 200A can generate a 3D image to display to the user that takes into account the real world objects around the user and allows the user to interact with the 3D object.

The device 200A may further include other sensors 232, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers 235 that allow the user to interact audially with the device.

Figure 2A:
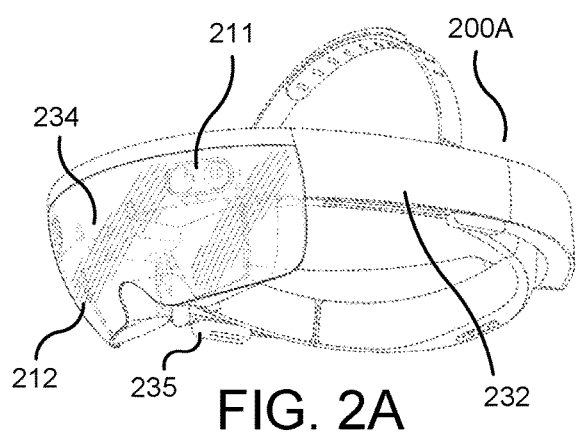
FIGS. 2A to 2D illustrate augmented reality viewing devices according to various embodiments.
Figure 2B:
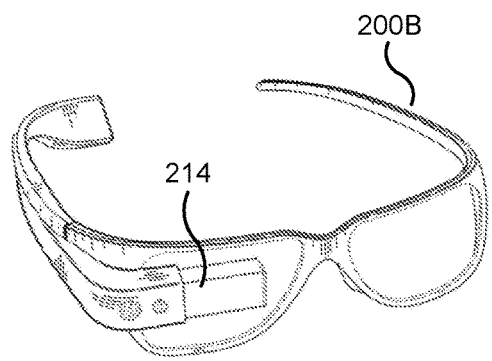

Referring to FIG. 2B, an AR device 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer. However, it will be appreciated that the device 200B may be incapable of displaying 3D images to the user.

Figure 2C:
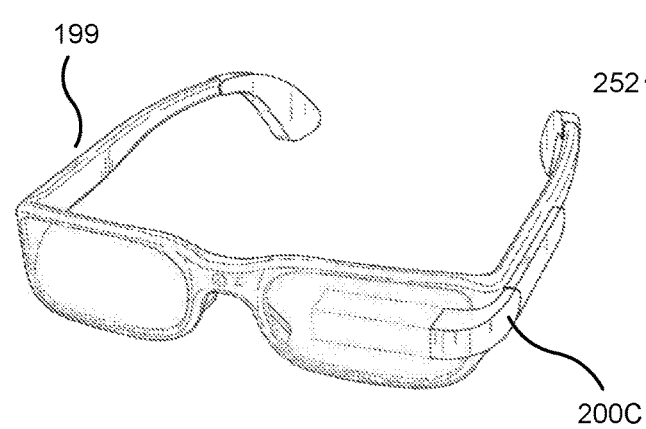

In other embodiments, referring to FIG. 2C, the AR device may be implemented using a virtual retinal display device 200C. In contrast to devices that display an image within the field of view of the user, a virtual retinal display 200C may raster scan an image directly onto the retina of the user. In some embodiments, the virtual retinal display 200C may include glasses 199 that may support and/or position virtual retinal display 200C relative to the user's eyes. In some embodiments, the virtual retinal display 200C may be configured to be removably coupled to glasses that are not provided with the virtual retinal display 200C. In such embodiments, the virtual retinal display may be used in conjunction with user supplied glasses 199 that may include lenses for correcting vision impairments. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

Figure 2D:
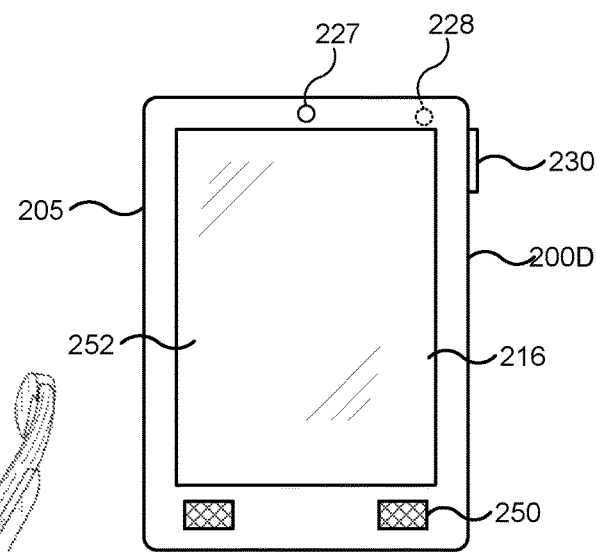

In still further embodiments, an AR device 200D, as shown in FIG. 2D, may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

Figure 2E:
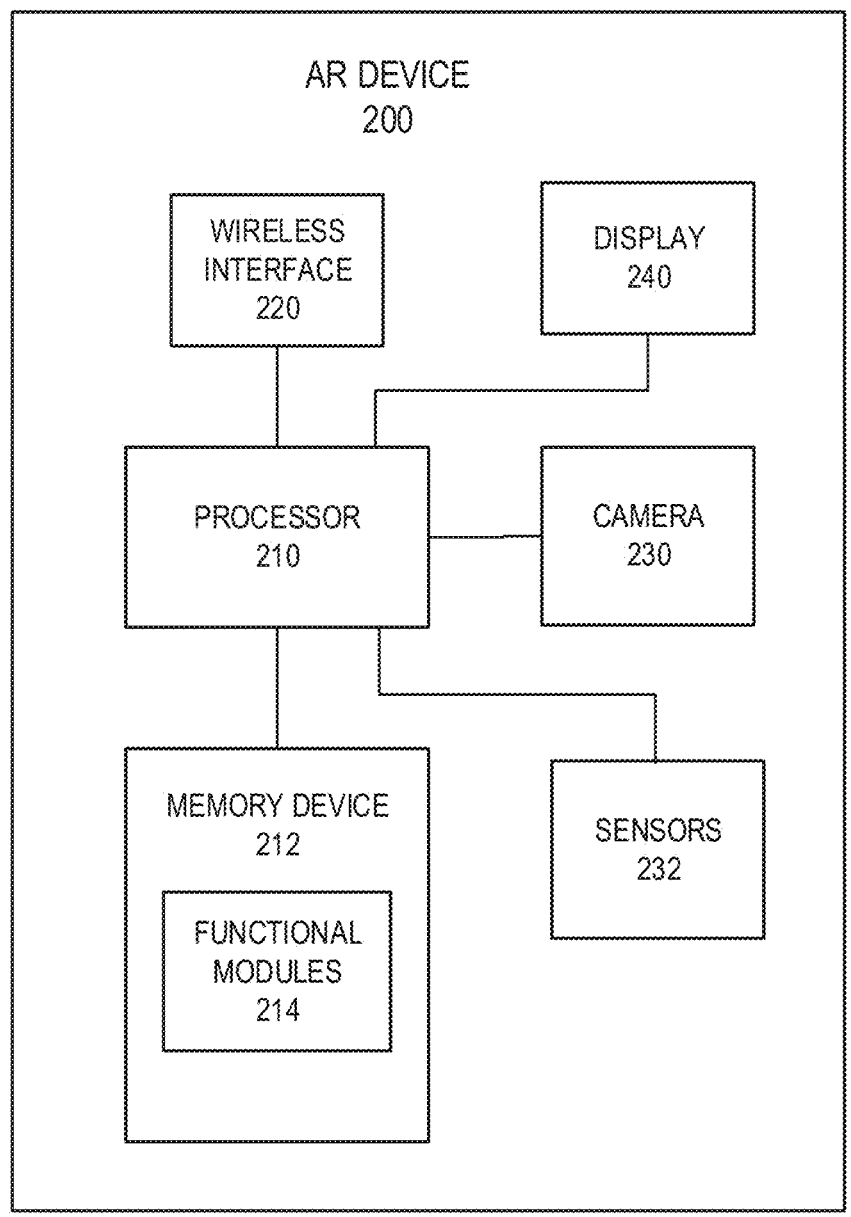
FIG. 2E is a schematic block diagram of an augmented reality device according to some embodiments.

FIG. 2E is a block diagram that illustrates various components of an AR device 200 according to some embodiments. As shown in FIG. 2E, the AR device 200 may include a processor 210 that controls operations of the AR device 200. Although illustrated as a single processor, multiple special purpose and/or general purpose processors and/or processor cores may be provided in the AR device 200. For example, the AR device 200 may include one or more of a video processor, a signal processor, a sound processor and/or a communication controller that performs one or more control functions within the AR device 200. The processor 210 may be variously referred to as a "controller," "microcontroller," "microprocessor" or simply a "computer." The processor may further include one or more application-specific integrated circuits (ASICs).

Various components of the AR device 200 are illustrated in FIG. 2E as being connected to the processor 210. It will be appreciated that the components may be connected to the processor 210 through a system bus, a communication bus and controller, such as a USB controller and USB bus, a network interface, or any other suitable type of connection.

The AR device 200 further includes a camera 230 for generating a video signal and a display 240 for displaying AR graphics to a user as virtual images or virtual elements. The AR graphics may be displayed directly within a field of view so as to appear to be present within a scene and/or may be digitally added to a live video signal so as to appear to be present within the live video signal.

The AR device 200 further includes a memory device 212 that stores one or more functional modules 214 for performing the operations described herein.

The memory device 212 may store program code and instructions, executable by the processor 210, to control the AR device 200. The memory device 210 may include random access memory (RAM), which can include volatile and/or non-volatile RAM (NVRAM) and other forms as commonly understood in the gaming industry. In some embodiments, the memory device 212 may include read only memory (ROM). In some embodiments, the memory device 212 may include flash memory and/or EEPROM (electrically erasable programmable read only memory). Any other suitable magnetic, optical and/or semiconductor memory may operate in conjunction with the gaming device disclosed herein.

The AR device 200 may include a wireless interface 220 that enables the AR device 200 to communicate with remote devices, such as EGMs 100 and/or an AR controller 70 over a wired and/or wireless communication network, such as a local area network (LAN), wide area network (WAN), cellular communication network, wireless LAN (Wifi), Bluetooth, near-field communications (NFC) or other data communication network. The wireless interface 220 may include multiple radios to support multiple types of simultaneous connections. For example, the wireless interface may include both a Wifi radio transceiver and a Bluetooth radio transceiver.

Electronic Gaming Machines

Figure 3A:
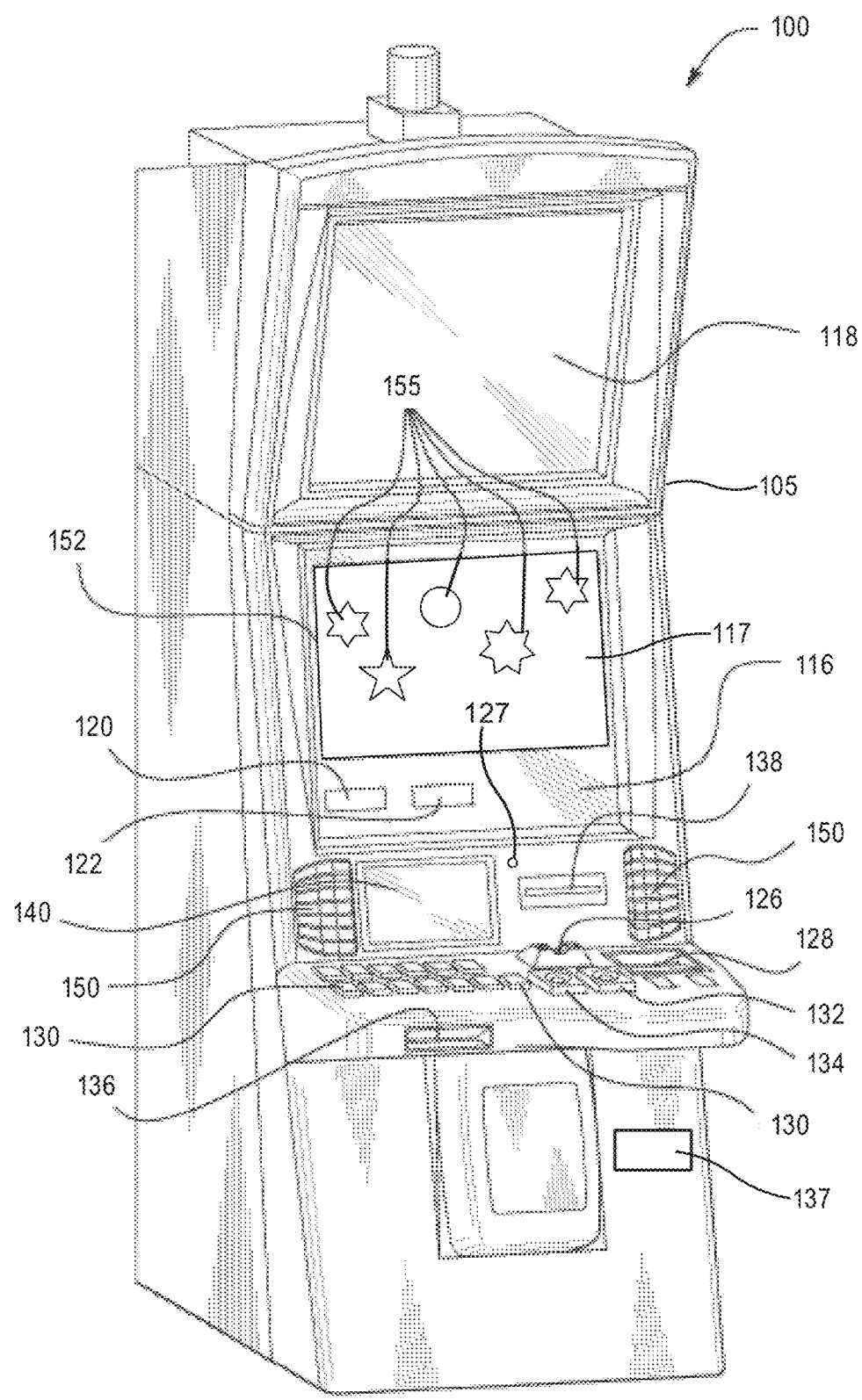
FIG. 3A is a perspective view of a gaming device that can be configured according to some embodiments.
Figure 3B:
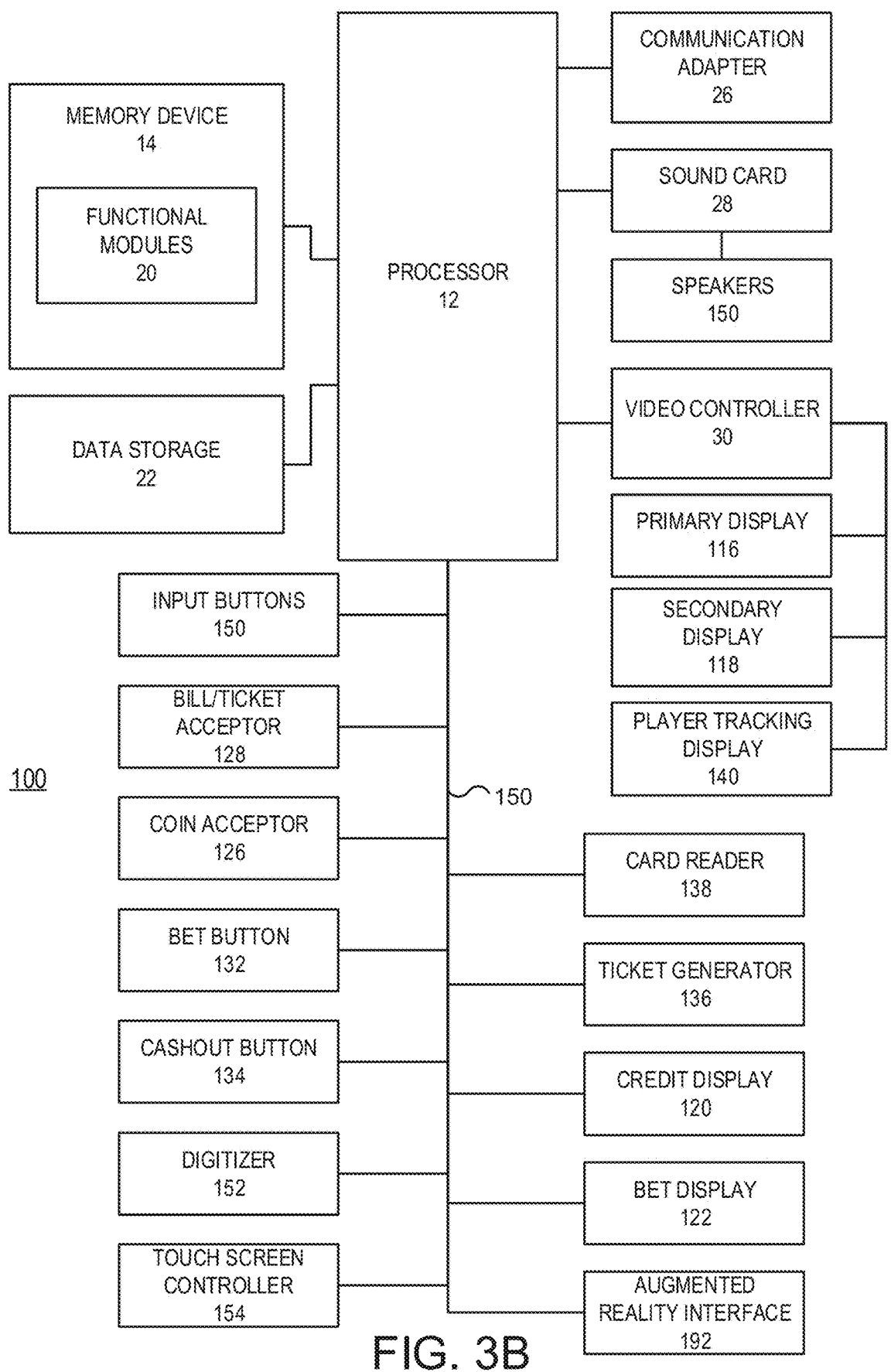
FIG. 3B is a schematic block diagram illustrating an electronic configuration for a gaming device according to some embodiments.
Figure 3C:
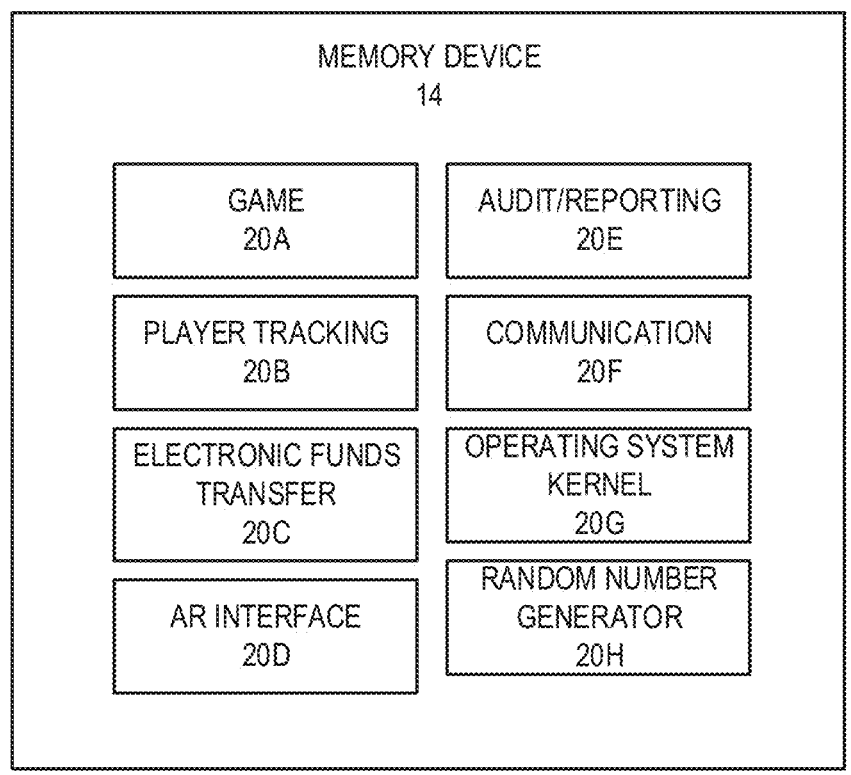
FIG. 3C is a schematic block diagram that illustrates various functional modules of a gaming device according to some embodiments.

An example of an electronic gaming machine (EGM) that can interact with mixed reality viewers according to various embodiments is illustrated in FIGS. 3A, 3B, and 3C in which FIG. 3A is a perspective view of an EGM 100 illustrating various physical features of the device, FIG. 3B is a functional block diagram that schematically illustrates an electronic relationship of various elements of the EGM 100, and FIG. 3C illustrates various functional modules that can be stored in a memory device of the EGM 100. The embodiments shown in FIGS. 3A to 3C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 3A and 3B. For example, referring to FIG. 3A, an EGM 100 may include a support structure, housing or cabinet 105 which provides support for a plurality of displays, inputs, outputs, controls and other features that enable a player to interact with the EGM 100.

The EGM 100 illustrated in FIG. 3A includes a number of display devices, including a primary display device 116 located in a central portion of the cabinet 105 and a secondary display device 118 located in an upper portion of the cabinet 105. A plurality of game components 155 are displayed on a display screen 117 of the primary display device 116. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the EGM 100.

The player tracking display 140 may be used to display a service window that allows the player to interact with, for example, their player loyalty account to obtain features, bonuses, comps, etc. In other embodiments, additional display screens may be provided beyond those illustrated in FIG. 3A. In some embodiments, one or more of the player tracking display 140, the credit display 120 and the bet display 122 may be displayed in one or more portions of one or more other displays that display other game related visual content. For example, one or more of the player tracking display 140, the credit display 120 and the bet display 122 may be displayed in a picture in a picture on one or more displays.

The EGM 100 may further include a number of input devices 130 that allow a player to provide various inputs to the EGM 100, either before, during or after a game has been played. For example, the EGM 100 may include input devices 130 that are a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 3A and 3B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices 130 of the EGM 100 are one or more wagering or betting devices. One such wagering or betting device includes a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 3B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 3B, operation of the primary display device 116, the secondary display device 118 and the player tracking display 140 may be controlled by a video controller 30 that receives video data from a processor 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor 12. In some embodiments however, the credit display 120 and/or the bet display 122 may be driven by the video controller 30.

Referring again to FIG. 3A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

As illustrated in FIG. 3A, the EGM 100 may also include a currency dispenser 137 that may include a note dispenser configured to dispense paper currency and/or a coin generator configured to dispense coins or tokens in a coin payout tray.

The EGM 100 may further include one or more speakers 150 controlled by one or more sound cards 28 (FIG. 3B). The EGM 100 illustrated in FIG. 3A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 3B is a block diagram that illustrates logical and functional relationships between various components of an EGM 100. As shown in FIG. 3B, the EGM 100 may include a processor 12 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 12 may be variously referred to as a "controller," "microcontroller," "microprocessor" or simply a "computer." The processor may further include one or more application-specific integrated circuits (ASICs).

Various components of the EGM 100 are illustrated in FIG. 3B as being connected to the processor 12. It will be appreciated that the components may be connected to the processor 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 3D.

The memory device 14 may store program code and instructions, executable by the processor 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor 12. U.S. Patent Application Publication No. 2004/0254014 describes a variety of EGMs including one or more communication ports that enable the EGMs to communicate and operate with one or more external peripherals.

In some embodiments, the EGM 100 may include a sensor, such as a camera in communication with the processor 12 (and possibly controlled by the processor 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor 12 may incorporate that image into the primary and/or secondary game as a game image, symbol or indicia.

Various functional modules of that may be stored in a memory device 14 of an EGM 100 are illustrated in FIG. 3C. Referring to FIG. 3C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The AR interface module 20D interacts with an AR device 200 as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 comprises a personal device, such as a desktop computer, a laptop computer, a mobile device, a tablet computer or computing device, a personal digital assistant (PDA), or other portable computing devices. In some embodiments, the EGM 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 3D:
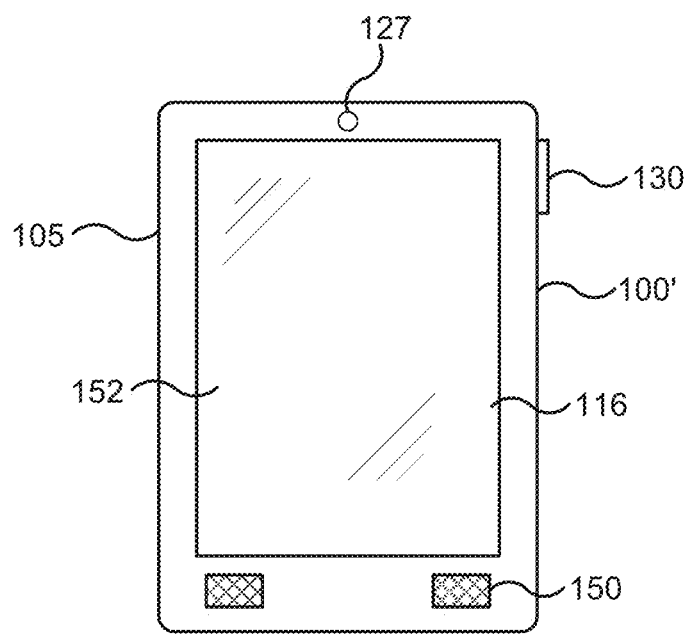
FIG. 3D is perspective view of a gaming device that can be configured according to some embodiments.

For example, referring to FIG. 3D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 3E:
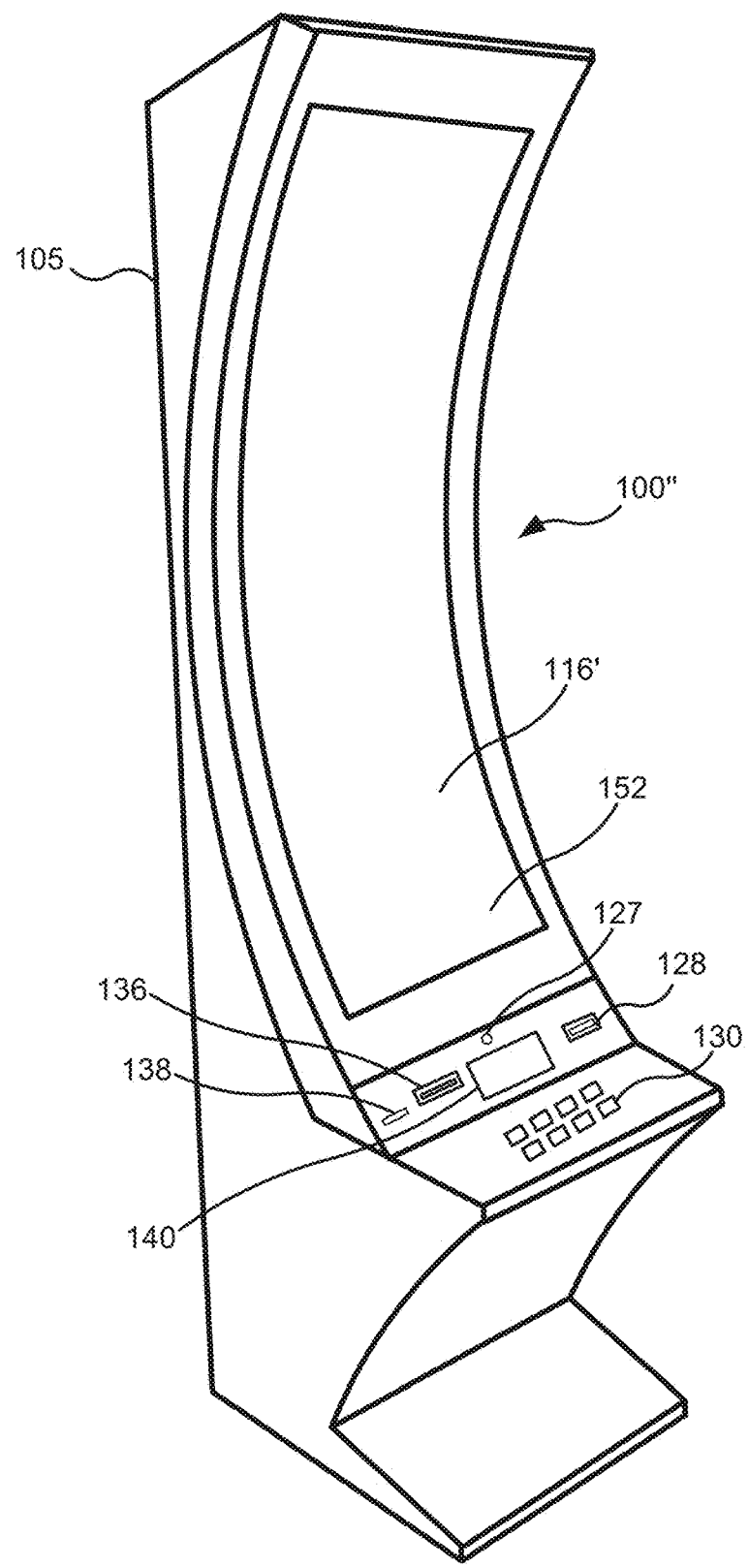
FIG. 3E is a perspective view of a gaming device according to further embodiments.

FIG. 3E illustrates a standalone EGM 100″ having a different form factor from the EGM 100 illustrated in FIG. 3A. In particular, the EGM 100″ is characterized by having a large, high aspect ratio, curved primary display device 116′ provided in the housing 105, with no secondary display device. The primary display device 116′ may include a digitizer 152 to allow touchscreen interaction with the primary display device 116′. The EGM 100″ may further include a player tracking display 140, a plurality of input buttons 130, a bill/ticket acceptor 128, a card reader 138, and a ticket generator 136. The EGM 100″ may further include one or more cameras 127 to enable facial recognition and/or motion tracking.

Although illustrated as EGMs, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games.

Augmented Reality Applications

As provided in FIG. 1-3E, as more and more AR viewing devices 200 become available to players, manufacturers of gaming machines, such as coin pushers 90 may desire to incorporate support for such devices into their machines. By providing AR display content in the context of a physical coin pusher machine, manufacturers may increase the flexibility of the prizes and/or types thereof that may be awarded, all while providing additional incentive for the player to play the physical coin pusher machine based on the potential for different prizes and/or the increased entertainment value.

Some embodiments of the inventive concepts provide a communication interface by which a coin pusher game can integrate AR device support with a relatively low amount of customization. According to some embodiments, a coin pusher 90 may communicate to an AR device 200 where on or near the coin pusher game and animation can be displayed and notify the AR device 200 of a triggering event for the animation, but the actual processing to determine exactly where, when and how to display the animation may be performed by the AR device 200 and/or an AR controller 70.

In some embodiments, an AR device 200 may be used to display game elements, game components, game information, game animation and/or other elements on one or more physical playfields of the physical coin pusher machine to a player while the player is engaged in playing a game on the coin pusher game. For example, an AR device 200 may be configured to display a two-dimensional or three-dimensional animation when a player wins a game by causing one or more coins to fall over the edge into a prize chute. The AR device 200 may display the special 3D animation within the player's field of view, which may include the physical playfield of the coin pusher game. For example, the AR device 200 may display the special 3D animation to appear as if it is moving nearer to the edge of the physical playfield, in this manner taunting the player to keep playing. Such animations, rendered in three dimensions in such a way that they appear to the player to be part of a real scene, can enhance the game play experience for the player.

Figure 4:
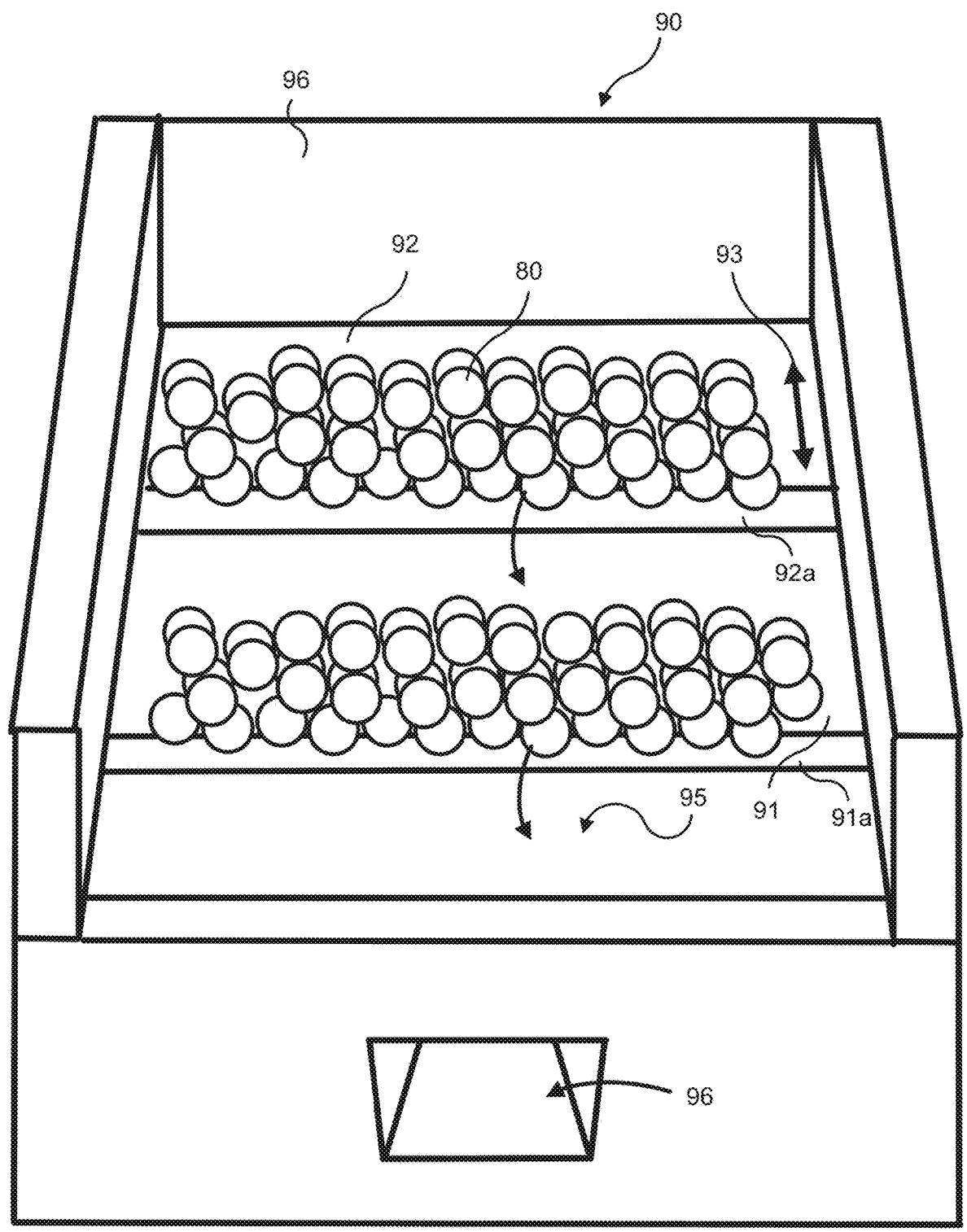
FIG. 4 is a front perspective schematic view of a coin pusher game according to some embodiments.

Reference is now made to FIG. 4, which is a front perspective schematic view of a coin pusher game according to some embodiments. The coin pusher 90 includes a cabinet 96 that include various structures such as sides, a back, a top and a bottom. Some embodiments provide that a front of the coin pusher 90 may be transparent so that a player may see game elements within the cabinet 96. As illustrated, the coin pusher 90 may include a physical playfield 91 that includes a drop off edge 91*a*. Embodiments of coin pusher games 90 may include a variety of mechanical arms and/or shelves. For example, as illustrated, a moving shelf 92 may be operable to constantly move back and forth along direction 93. Some embodiments provide that there are more than one tiered stationary and/or moving shelves.

The coin pusher 90 may include a variety of different mechanisms for the user to deposit coins 80. Such mechanisms (not illustrated) may include moving and/or static chutes, coin launchers, slides and/or ramps to receive the coins 80. As coins 80 are deposited into the coin pusher 90, such coins may land on the moving shelf 92 with a goal of causing coins 80 to fall off the moving shelf edge 92*a* onto the physical playfield 91. Coins 80 falling onto the physical playfield 91 may cause coins 80 to fall off the drop off edge 91*a* into an award chute 95 that allows the coin 80 that has fallen to be deposited into an award tray 97 that is accessible to the user. In this manner, everything that falls from the physical playfield 91 into the award chute 95 is a prize that the user may retrieve from the award tray 96. Thus, the user launches or deposits a new coin 80 into the playing area and the physics of the game determine if any coins fall off the drop off edge 91*a* and are collected by the user. In such embodiments, the user may receive an award based on coins that fall into the award chute 97 and virtual elements 490 that may fall off the drop off edge 91*a*.

Although not illustrated, embodiments of coin pusher games 90 may include multiple different types of moving arms and/or surfaces including sliding shelves, arm mounted wipers, and/or spinning surfaces, among others.

Figure 5:
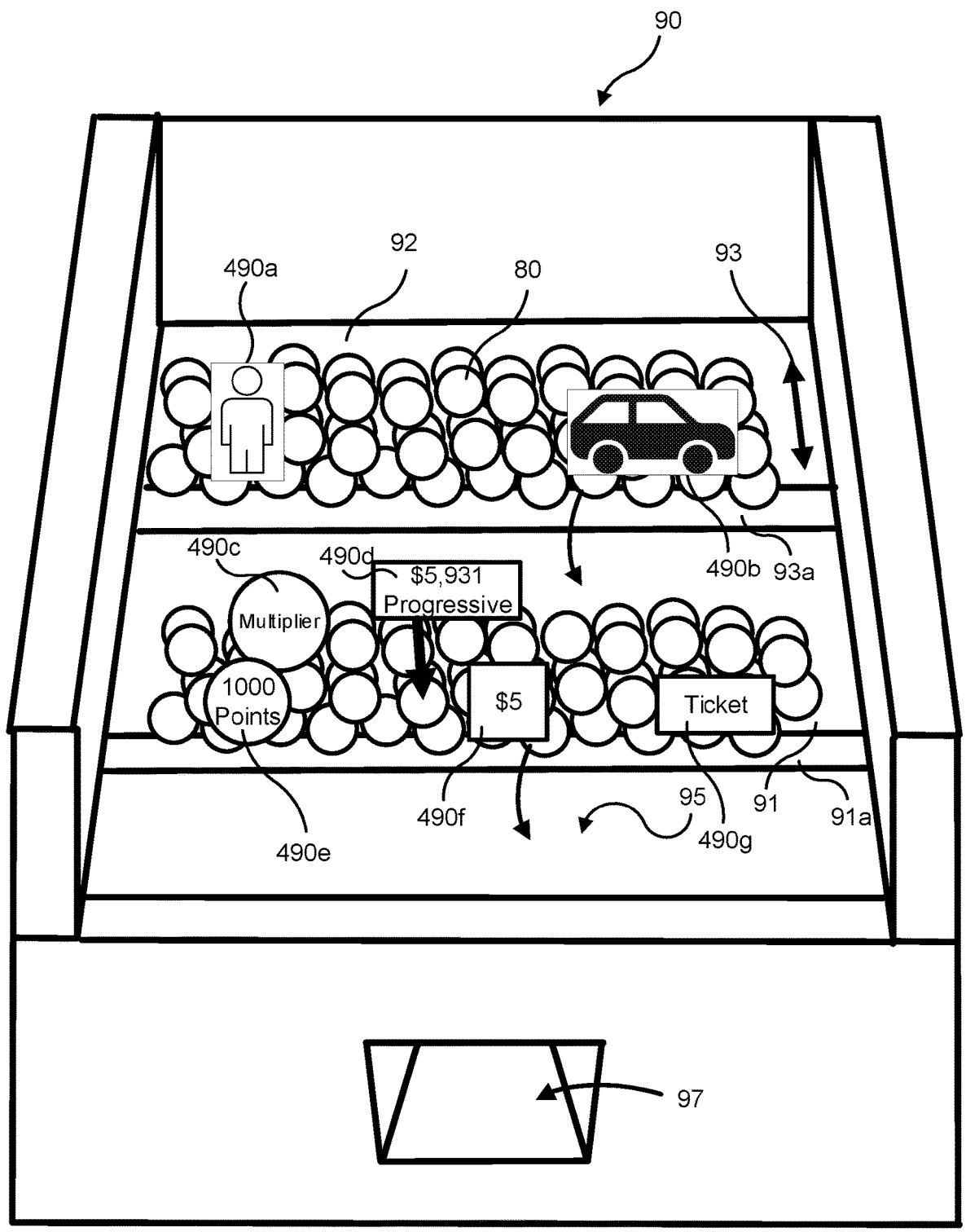
FIG. 5 is a front perspective schematic view of a coin pusher game including AR display content that is associated with elements of the coin pusher game according to some embodiments.

Reference is now made to FIG. 5, which is a front perspective schematic view of a coin pusher game including AR display content that is associated with elements of the coin pusher game according to some embodiments. The coin pusher 90 of FIG. 5 may include similar features as discussed above regarding FIG. 4, which will not be repeated. The AR device 200 may display virtual elements 490 onto any of the locations in the coin pusher 90 to provide a combined view of the coin pusher 90 and the virtual elements 490. In some embodiments, the virtual elements 90 may be displayed near an edge of one or more playfield surfaces include the physical playfield 91 and the moving shelf 92.

Some embodiments provide that the virtual elements 490 may be operable to interact with the physics corresponding to the coins 80. For example, a virtual element 490 may be associated with a specific one of the coins 80 and may fall off the drop off edge 91*a* when that coin 80 falls off the drop off edge 91*a*. In such cases, the user may win the actual coin 80 and may be awarded an AR award corresponding to the virtual element 490 that falls with the coin 80.

Embodiments herein provide that the virtual elements 490 may include many different elements and/or types of elements. For example, a virtual element 490 may include virtual coins represent some type of value. One example includes a multiplier coin 490*c* that may be applied to one or more games, including wagering games, bonus games, lotteries, and/or jackpots among others. Some embodiments provide that the virtual coin represents a given number of credits or points. For example, coin 490*c* may represent 1000 points corresponding to promotional credits, social network credits, mobile play credits, and/or loyalty account points, among others.

In some embodiments, a virtual element 490 includes a cash award virtual element 490*f* that represents a cash award that can be collected at a cash counter or other cashout facility. The cash award virtual element 490*f* may be represented by an image of the currency award or other images of value such as gold coins or the like.

Some embodiments provide that the virtual element 490 includes a dynamic award that may change in value and/or may have a time-out limitation, after which the virtual element 490 is no longer visible or available. For example, a virtual progressive award 490*d* may identify a specific coin 80 as having a value that corresponds to a progressive jackpot. In such embodiments, the virtual progressive award 490*d* may include an identification of the progressive amount and an arrow that identifies which coin 80 represents that amount. Some embodiments provide that the virtual progressive award is represented as a luxury item such as an expensive car, boat, or jewelry among others. The amount that is displayed on the virtual progressive award 490*d* may change as the value of the jackpot changes.

In some embodiments, the dynamic award may include a virtual ticket 490*g* that represents a prize that may be redeemed. In some embodiments, the virtual ticket may be displayed in more than one coin pusher 90 and may be awarded to the first person to win that virtual ticket 490*g*. In such embodiments, the virtual ticket 490*g* may disappear from the displays of other users at other coin pusher games 90. In some embodiments, the virtual ticket 490*g* may represent a prize that has value for a finite time. For example, the virtual ticket 490*g* may represent tickets to a dining experience and/or to see a show or other event. In such embodiments, once the show or event is no longer available, the virtual ticket 490*g* may cease to be displayed and/or be modified to identify another show or event occurring at some later time.

In some embodiments, the virtual ticket 490*g* may be redeemed for physical prizes such as appliances, jewelry, and/or clothing, among others. Virtual elements 490 may include images corresponding to such physical prizes according to some embodiments. In some embodiments, the virtual ticket award value may be determined when the virtual ticket falls into the award tray 97.

In some embodiments, virtual elements 490 may include virtual figurines 490*a* such as superheroes, celebrities, entertainment characters, etc. The figurines may be dynamic and may be displayed to help the user in causing other virtual elements to fall off the drop-off edge 91*a*. For example, responsive to a coin 80 falling off the drop-off edge 91*a*, a virtual figurine 490*a* may move to push another virtual element 490*e* off the drop-off edge 91*a*. In some embodiments, more than one virtual figurines 490*e* may interact with one another, such as in a duel or other competitive interaction.

In some embodiments, each of the virtual elements 490 may be associated with one or more of the coins 80 such that when the coin pusher game physics cause the associated coins to move or fall, the virtual element 490 is caused to move or fall.

Some embodiments provide that different virtual elements 490 represent different game elements that correspond to a secondary game, the outcome of which is based on combinations of the game elements to win an AR award. Different combinations of the game elements may generate different AR awards. In some embodiments, the interaction between coins and the virtual elements 490 is responsive to an additional coin being received by the coin pusher 90.

In some embodiments, the virtual elements 490 may include a first virtual element and a second virtual element and may provide that the first virtual element is competitive relative to the second virtual element in a virtual contest that includes interactions between the first and second virtual elements. The interactions may be generated responsive to additional coins being received by the physical coin pusher and/or to movement of ones of the coins. The AR awards may include a first AR award that is associated with the first virtual element and a second AR award that is associated with the second virtual element and the first award is provided to the user responsive to the first virtual element winning the virtual contest over the second virtual element. Alternatively, the second award may be provided to the user responsive to the second virtual element winning the virtual contest over the first virtual element.

Figure 6:
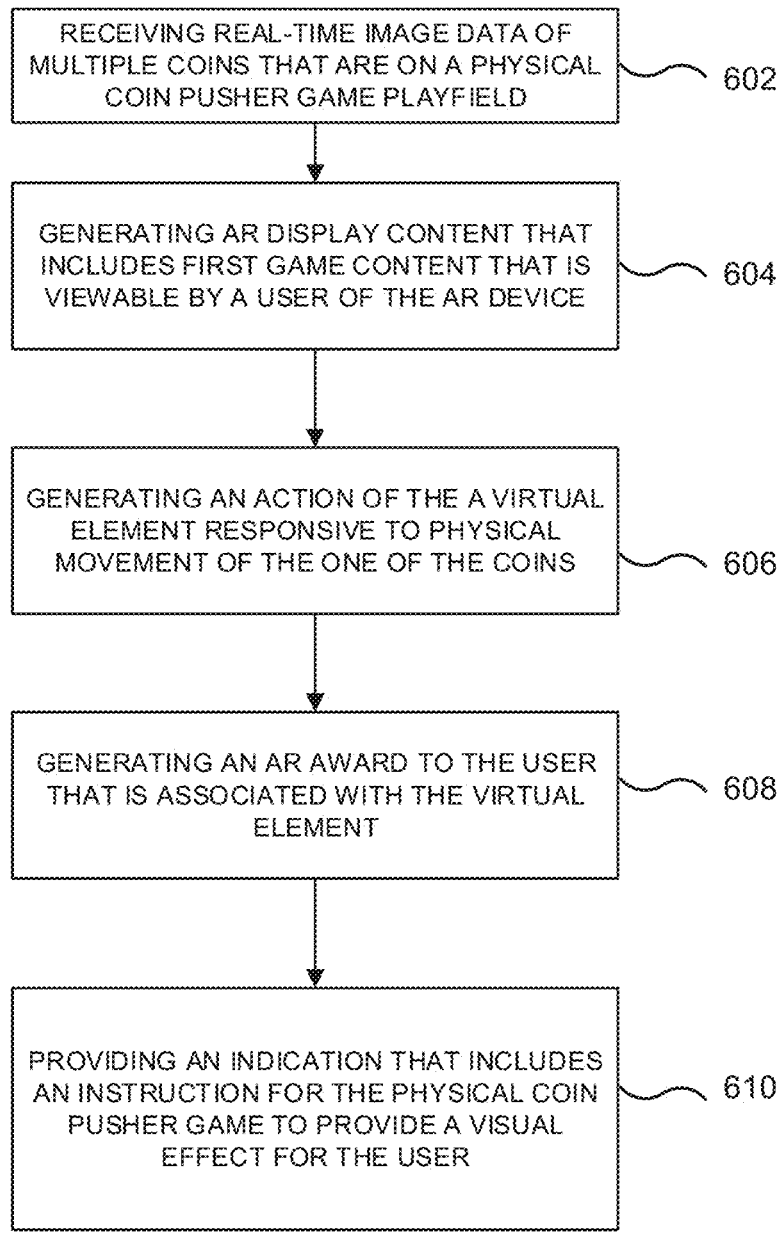
FIG. 6 is a flowchart illustrating operations of systems/methods according to some embodiments.

Reference is now made to FIG. 6, which is a flowchart illustrating operations of systems/methods according to some embodiments. A computer implemented method includes operations of receiving real-time image data of multiple coins 80 that are on a physical coin pusher playfield 91 and that are adjacent a drop-off edge of the physical coin pusher playfield (block 602). In some embodiments, the real-time image data is received via a camera or other image capture device that is a component of an AR device 200.

Operations include generating, using the AR device, AR display content that includes first game content that is viewable by a user of the AR device (block 604). The AR display content may be associated with one of the coins 80 and may include a virtual element that corresponds to the one of the coins 80. Some embodiments provide that the virtual element includes an image of a coin, a representation of monetary value, a statue, a symbol, a figurine, a casino chip, a ticket to an event, a voucher, a vehicle, and/or a scenic location, among others. In some embodiments, the virtual element comprises a dynamic image that is configured to perform movement and/or action according to a type of the first virtual element. Some embodiments provide that there are multiple different virtual elements that include multiple different types thereof.

Some embodiments include generating an action of the virtual element responsive to physical movement of the one of the plurality of coins (block 606) and, responsive to generating the action of the first element, generating an AR award to the user that is associated with the virtual element (block 608). In some embodiments, a combined image corresponding to an image of the physical coin pusher game that is viewable through the AR device and the AR display content generated by the AR device is provided to the user.

Some embodiments provide that the physical movement of one of the coins is responsive to another coin being deposited into the coin pusher 90. In response to the deposited coin, one of the coins moves to a position on the drop-off edge of the physical coin pusher playfield that causes one of the coins to fall off the physical coin pusher playfield 91 and into the award chute 95. Once the coin falls off the physical coin pusher playfield 91 and into the award chute 95, the action of the virtual element includes an animated action of the virtual element. In some embodiments, the animated action of the virtual element includes falling from the physical coin pusher playfield 91, diving from the physical coin pusher playfield 91, jumping from the physical coin pusher playfield 91, interacting with another virtual component of the AR display content, or moving based on a type of the virtual element.

In some embodiments, the AR award includes a monetary award, game play credits, loyalty account points, physical prizes, a progressive entry, social play credits and/or prizes, and/or mobile play credits and/or prizes, among others.

In some embodiments, the virtual element is configured to change to different images that correspond to different AR awards that include different values. For example, a single virtual element may alternate between two or more different awards having different values. Based on the relative values, the user may try to time the depositing of coins in an effort to achieve one of the awards relative to the other awards. For example, a first image may have first award that may have lower value than a second award of a second image and the user may try to win the second award corresponding to the virtual element when it is the second image. Thus, when the action of the virtual element is generated while the virtual element is the first image then the user will receive the first award. Similarly, when the action of the virtual element is generated while the virtual element is the second image then the user will receive the second award.

In some embodiments, the AR award that is associated with the virtual element is a time limited award that is displayed for a given time period and that is not displayed after the given time period is elapsed. In such cases, the AR award is not available after the given time period is elapsed.

Some embodiments provide that the AR award is a multiplier corresponding to a primary wagering game. In some embodiments, the multiplier corresponds to a bonus score in the primary wagering game and/or the payout in the primary wagering game. In some embodiments, the multiplier is applied to multiply an amount of coins dropped in the physical coin pusher game.

Some embodiments provide that wherein the AR virtual element includes a dynamic virtual element that visually changes responsive to a progressive game value. In such embodiments, the AR award may include the progressive payout that increases as players play one or more physical coin pushers.

In some embodiments, the action of the virtual element is configured to be based on fictional physics rules that are different from real-world physics rules. For example, fictional physics rules may include rules causing the virtual element to explode into different and/or multiple other virtual elements, rules causing gravitational effects on the virtual element to be different in magnitude and/or direction, and/or rules causing motion and/or inertia effects on the virtual element that are different from real-world physics.

In some embodiments, the virtual element is displayed in multiple different instances to multiple different users on different respective AR devices 200. In some embodiments, once an award corresponding to the virtual element is generated, the remaining instances of the virtual element may be removed from the AR display content on the other AR devices 200.

As provided above, in some embodiments the AR device 200 is a user mobile telecommunications terminal. In such embodiments, generating the AR award to the user may include sending data corresponding to the award to the user's mobile telecommunications terminal.

Operations may further include providing, to the coin pusher 90, an indication corresponding to the action of the virtual element that includes an instruction for the coin pusher 90 to provide a visual effect for the user (block 610). The visual effect provided by the coin pusher 90 may include lighting and/or sound effects that correspond to the action of the virtual effect. For example, if the action includes an explosion, the lighting effect may include flashing lights and the sound effect may include the sound of an explosion. If the action corresponds to a car or other vehicle, the sound effect may include an engine roar, tire squeal and/or screeching brakes. Still further, if the action corresponds to a real or fictional character and/or animal, the sound effect may include sounds that correspond to that character and/or animal.

Additionally, in addition to the coin pusher 90 providing the sound effects, the AR device 200 may provide the same and/or complementary sound effects that are based on the action.

Figure 7:
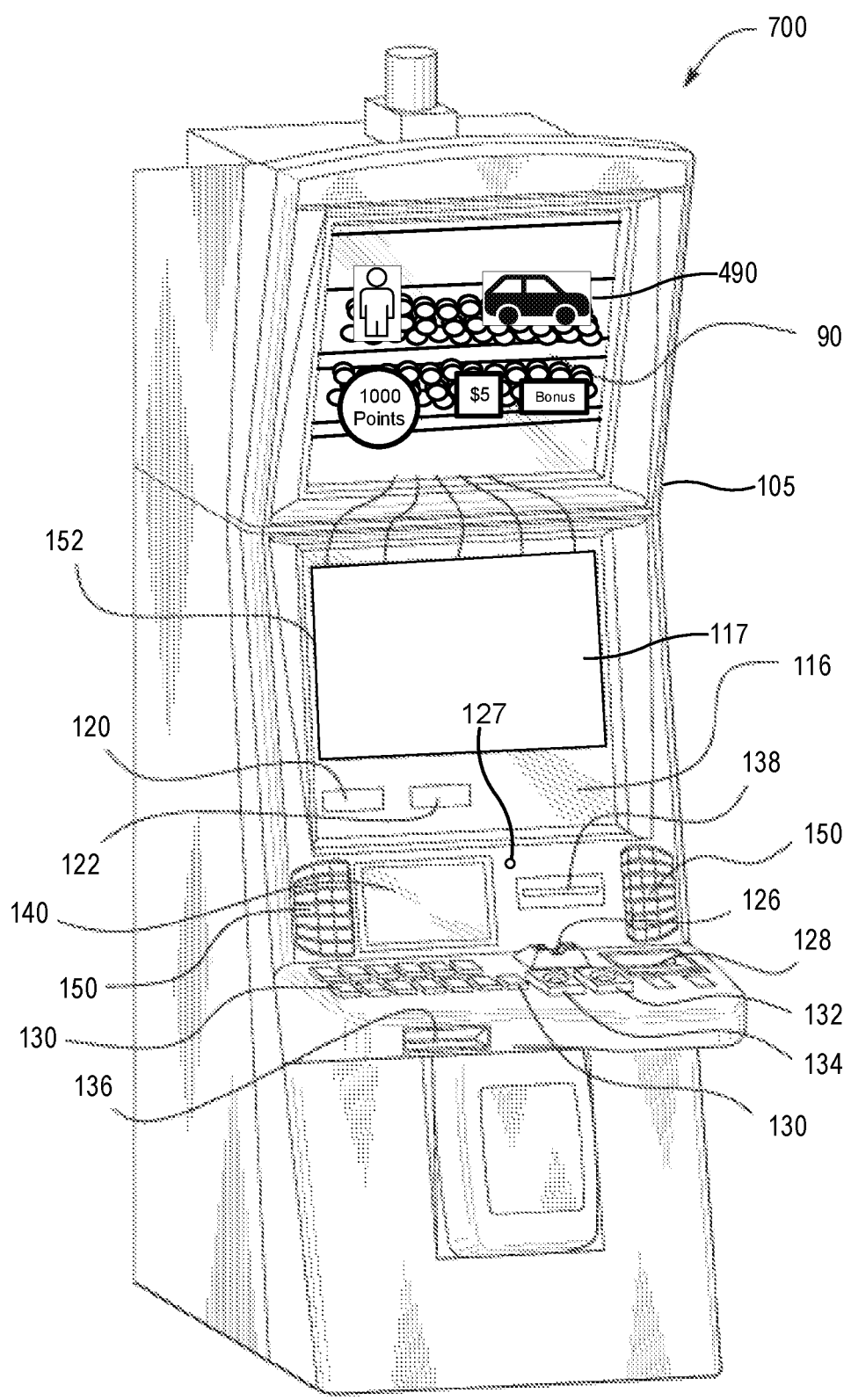
FIG. 7 is a perspective view of an EGM that include a physical coin pusher game according to some embodiments.

Reference is now made to FIG. 7, which is a perspective view of an EGM that include a physical coin pusher game according to some embodiments. Many of the features of the EGM 100 are discussed above regarding EGM 100 of FIG. 3A and thus will be omitted from further discussion. As illustrated the EGM 100 includes a coin pusher 90 integrated therein and may include AR display content that is provided using an AR device 200 (not illustrated here). As discussed above regarding FIG. 5, the AR device 200 may display virtual elements 490 onto any of the locations in the coin pusher 90 to provide a combined view of the coin pusher 90 and the virtual elements 490. In some embodiments, the virtual elements 90 may be displayed near an edge of one or more playfield surfaces include the physical playfield. The virtual elements 490 may be operable to interact with the physics corresponding to the coins and may be associated with a specific one of the coins and may fall off the drop-off edge when that coin falls. In such cases, the user may win the actual coin 80 and may be awarded a prize corresponding to the virtual element 490 that falls with the coin 80.

In some embodiments, the prize corresponding to the virtual element 490 may include an AR award that provides a value to the user in the wagering game that is being played on the EGM 700. For example, the AR award may include bonus credits, play credits, multipliers, wild cards and/or symbols, and special graphics and/or sounds, among others.

Although embodiments described above generally include a physical coin pusher, embodiments herein are not so limited. For example, an AR device 200 described herein may provide AR display content that includes a virtual coin pusher game that includes virtual coins that each are associated with an AR award. For example, a user may be playing a wagering game and, responsive to a wagering event that occurs in the wagering game, the virtual coin pusher game may receive a deposited virtual coin. In response to receiving the virtual coin, one of the other virtual coins may be pushed off a virtual playfield in the virtual coin pusher and an AR award corresponding to that coin may be awarded to the user. In some embodiments, the wagering game may include a table game that includes dice and/or cards as game elements and the wagering event may include a wager being placed on the wagering game by the user.

AR Controller

Figure 8:
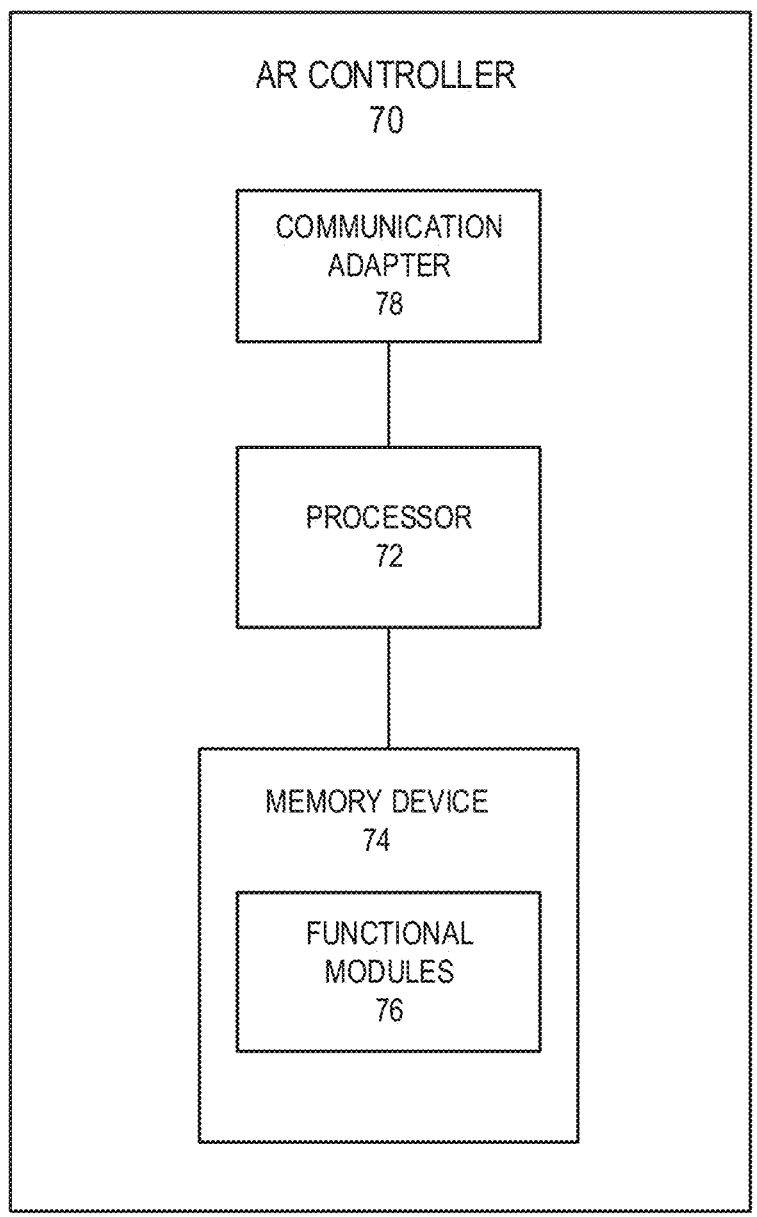
FIG. 8 is a schematic block diagram illustrating an electronic configuration for an augmented reality controller according to some embodiments.

FIG. 8 is a block diagram that illustrates various components of an AR controller 70 according to some embodiment. As shown in FIG. 8, the AR controller 70 may include a processor 72 that controls operations of the AR controller 70. Although illustrated as a single processor, multiple special purpose and/or general purpose processors and/or processor cores may be provided in the AR controller 70. For example, the AR controller 70 may include one or more of a video processor, a signal processor, a sound processor and/or a communication controller that performs one or more control functions within the AR controller 70. The processor 72 may be variously referred to as a "controller," "microcontroller," "microprocessor" or simply a "computer." The processor may further include one or more application-specific integrated circuits (ASICs).

Various components of the AR controller 70 are illustrated in FIG. 8 as being connected to the processor 72. It will be appreciated that the components may be connected to the processor 72 through a system bus, a communication bus and controller, such as a USB controller and USB bus, a network interface, or any other suitable type of connection.

The AR controller 70 further includes a memory device 74 that stores one or more functional modules 76 for performing the operations described above.

The memory device 74 may store program code and instructions, executable by the processor 72, to control the AR controller 70. The memory device 74 may include random access memory (RAM), which can include non-volatile RAM (NVRAM), magnetic RAM (MRAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The AR controller 70 may include a communication adapter 78 that enables the AR controller 70 to communicate with remote devices, such as EGMs 100, coin pusher games 90 and/or a player tracking server 45 (FIG. 1) over a wired and/or wireless communication network, such as a local area network (LAN), wide area network (WAN), cellular communication network, or other data communication network.

The AR controller 70 may include one or more internal or external communication ports that enable the processor 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor 72.

Other EGM Features

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device. For example, a mobile device may be communicatively coupled to an EGM and may include a user interface that receives user inputs that are received to control the EGM. The user inputs may be received by the EGM via the mobile device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Embodiments provided herein may provide improved accessibility to wagering stations by including additional user interface technologies, such as augmented reality. Such embodiments may improve technological efficiency by coordinating the augmented reality with examples of different types of wagering stations.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:
a communication interface;
a processor; and
a memory coupled to the processor, the memory comprising machine readable instructions that, when executed by the processor, cause the processor to:
receive, via an augmented reality (AR) device, real-time image data of a plurality of coins that are on a physical coin pusher playfield of a physical coin pusher game and that are adjacent a drop-off edge of the physical coin pusher playfield;
generate AR display content that comprises first game content that is viewable by a user of the AR device and that is associated with one of the plurality of coins, wherein the AR display content comprises a first virtual element that corresponds to the one of the plurality of coins;
generate an action of the first virtual element responsive to a physical movement of the one of the plurality of coins and that is to be displayed using the AR device;
responsive to generating the action of the first virtual element, generate an AR award to the user that is associated with the first virtual element; and
wherein a combined image corresponds to an image of the physical coin pusher playfield viewable through the AR device and the AR display content.

2. The system of claim 1, wherein the physical movement of the one of the plurality of coins is responsive to another coin being deposited into the physical coin pusher game,
wherein the one of the plurality of coins moves to a position on the drop-off edge that causes the one of the plurality of coins to fall off the physical coin pusher playfield,
wherein, responsive to the one of the plurality of coins falling off the physical coin pusher playfield, the action of the first virtual element comprises an animated action of the first virtual element, and
wherein the animated action of the first virtual element comprises one of falling from the physical coin pusher playfield, diving from the physical coin pusher playfield, jumping from the physical coin pusher playfield, interacting with a second virtual component of the AR display content, and moving based on a type of the first virtual element.

3. The system of claim 1, wherein the processor is further caused to provide, to the physical coin pusher game, an indication corresponding to the generated action of the first virtual element that includes an instruction for the physical coin pusher game to provide a visual effect for the user.

4. The system of claim 1, wherein the first virtual element comprises an image of a coin, a representation of monetary value, a statue, a symbol, a figurine, a casino chip, a ticket to an event, a voucher, a vehicle or a scenic location.

5. The system of claim 1, wherein the first virtual element comprises a dynamic image that performs a movement according to a type of the first virtual element.

6. The system of claim 1, wherein the AR award comprises a monetary award, game play credits, loyalty account points, physical prizes, a progressive entry, social play credits or prizes, or mobile play credits or prizes.

7. The system of claim 1, wherein the first virtual element changes to different images that correspond to different ones of a plurality of different AR awards,
wherein a first AR award comprises a first value and a second AR award comprises a second value that is greater than the first value, and
wherein responsive to the action of the first virtual element being generated while the first virtual element is the image corresponding to the first AR award, generating the AR award to the user further causes the processor to award the first AR award to the player, and
wherein responsive to the action of the first virtual element being generated while the first virtual element is the image corresponding to the second AR award, generating the AR award to the user further causes the processor to award the second AR award to the player.

8. The system of claim 1, wherein the processor causes the first virtual element to be displayed for a first time duration, and wherein the AR award is only available during the first time duration.

9. The system of claim 1, wherein the first AR award comprises a multiplier corresponding to a primary wagering game, and
wherein the multiplier corresponds to a bonus score in the primary wagering game, or the payout in the primary wagering game.

10. The system of claim 9, wherein the multiplier is applied to multiply a value corresponding to an amount of coin dropped in the physical coin pusher.

11. The system of claim 1, wherein the AR virtual element comprises a dynamic virtual element that visually changes responsive to a progressive game value, and
wherein the AR award comprises the progressive payout that increases as players play.

12. The system of claim 1, wherein the action of the first virtual element is based on fictional physics rules that are different from real-world physics rules, and wherein the fictional physics rules comprise rules causing the virtual element to explode into other virtual elements, rules causing gravitational effects on the virtual element to be different in magnitude or direction, or rules causing motion or inertia effects on the virtual element.

13. The system of claim 1, wherein the first virtual element is displayed in a plurality of instances to a plurality of users using a plurality of AR devices, and
wherein responsive to one of the plurality of instances generating the AR award to one of the plurality of users that is associated with one of the plurality of instances of the first virtual element, the method further comprising removing remaining ones of the plurality of instances of the first virtual element from corresponding ones of the plurality of AR devices.

14. The system of claim 1, wherein the AR device comprises a user mobile telecommunications terminal,
wherein generating the AR award to the user comprises causing the processor to send data corresponding to the award to the user mobile telecommunications terminal.

15. An augmented reality (AR) system comprising:
a physical coin pusher game that receives coins from a user, the physical coin pusher game comprising:
a playfield that supports a plurality of coins and that comprises a drop-off edge; and
a mechanical device that sweeps ones of the plurality of coins off a portion of the playfield, wherein responsive to the ones of the plurality of coins being swept off the portion of the playfield, a return coin of the plurality of coins is pushed to a position on the drop-off edge that causes the coin to fall off the playfield;
an augmented reality (AR) device that generates AR display content that comprises first game content that is viewable by a user of the AR device and that is associated with one of the plurality of coins, the AR device comprising:
a processing circuit;
a transceiver coupled to the processing circuit; and
a display device coupled to the processing circuit and that displays the AR display content within a field of view of a user when the user is viewing the playfield of the physical coin pusher game,
wherein the AR display content comprises a plurality of virtual elements that are displayed as being on the playfield and that are associated with a plurality of AR awards that are provided to the user based on interaction between ones of the plurality of coins and ones of the plurality of virtual elements.

16. The AR system of claim 15, wherein the physical coin pusher game is a component of an electronic gaming machine that provides a wagering game to the user, and
wherein the plurality of AR awards comprises an award that provides a value to the user in the wagering game.

17. The AR system of claim 15, wherein a portion of the plurality of virtual elements comprise a plurality of game elements that correspond to a secondary game that is based on combinations of ones of the plurality of game elements to win one of the plurality of AR awards,
wherein different combinations of the plurality of game elements generate different ones of the plurality of AR awards, and
wherein the interaction between ones of the plurality of coins and ones of the plurality of virtual elements is responsive to an additional coin being received by the physical coin pusher game.

18. The AR system of claim 15, wherein a portion of the plurality of virtual elements comprise a first virtual element and a second virtual element,
wherein the first virtual element is competitive relative to the second virtual element in a virtual contest that includes interactions between the first and second virtual elements that are generated responsive to additional coins being received by the physical coin pusher or to movement of ones of the plurality of coins,
wherein the plurality of AR awards comprises a first AR award that is associated with the first virtual element and a second AR award that is associated with the second virtual element, and
wherein the first award is provided responsive to the first virtual element winning the virtual contest over the second virtual element or the second award is provided responsive to the second virtual element winning the virtual contest over the first virtual element.

19. An augmented reality (AR) apparatus comprising:
a processing circuit;
a transceiver coupled to the processing circuit; and
a display device coupled to the processing circuit and that displays AR display content within a field of view of a user while the user is playing a wagering game,
wherein the AR display content comprises a virtual coin pusher game that includes a plurality of virtual coins that each are associated with an AR award,
wherein responsive to a wagering event that occurs in the wagering game, the virtual coin pusher game receives a deposited coin, wherein responsive to receiving the deposited coin, one of the plurality of virtual coins is pushed off a virtual playfield of the virtual coin pusher game and the AR award corresponding to the one of the plurality of virtual coins that is pushed off the playfield is awarded to the user.

20. The AR apparatus of claim 19, wherein the wagering game comprises a table game that includes dice or cards as game elements, wherein the wagering event comprises a wager placed on the wagering game that is placed by the user.

* * * * *